(No Model.)
2 Sheets—Sheet 1.

G. E. BOURELL & E. M. HARRISON.
PLANTER.

No. 457,699. Patented Aug. 11, 1891.

WITNESSES:

INVENTORS
Geo. E. Bourell & E. M. Harrison
BY
O. E. Duffy
ATTORNEY (No Model.) 2 Sheets—Sheet 2.
G. E. BOURELL & E. M. HARRISON.
PLANTER.
No. 457,699. Patented Aug. 11, 1891.
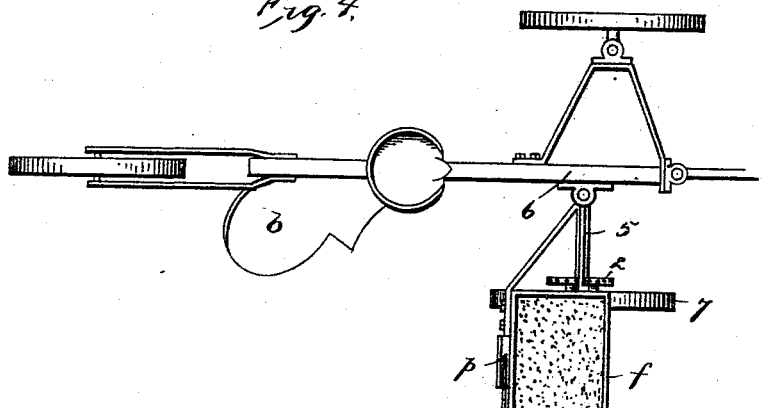
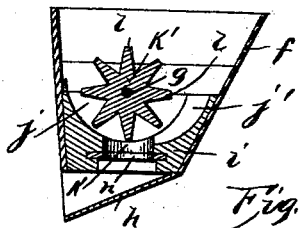
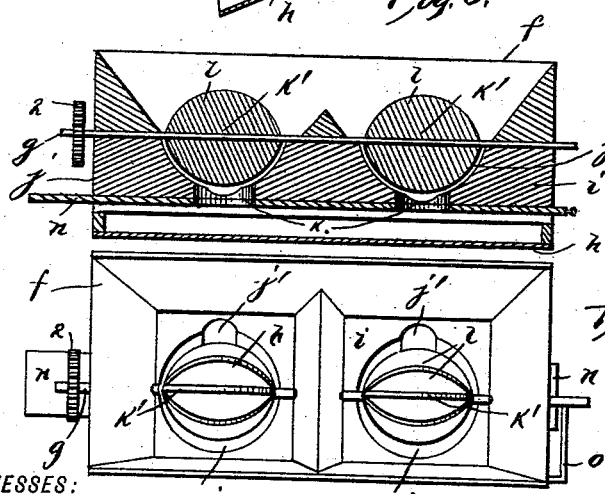
WITNESSES:
INVENTORS: Geo. E. Bourell, E. M. Harrison
BY O. E. Duffy
ATTORNEY.

UNITED STATES PATENT OFFICE.

GEORGE E. BOURELL AND ELIAS M. HARRISON, OF GRANT, NEBRASKA, ASSIGNORS TO SAID HARRISON.

PLANTER.

SPECIFICATION forming part of Letters Patent No. 457,699, dated August 11, 1891.

Application filed January 13, 1891. Serial No. 377,652. (No model.)

*To all whom it may concern:*

Be it known that we, GEORGE E. BOURELL and ELIAS M. HARRISON, of Grant, in the county of Perkins and State of Nebraska, have invented certain new and useful Improvements in Planters; and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in agricultural implements, and more particularly to planters.

The object of the invention is to provide improved means by which grain or seed can be sowed evenly at an even depth and at a suitable distance below the surface of the ground; and the further object is to provide certain improvements in details of construction and connection of parts, as more fully set forth hereinafter. These objects are accomplished by and this invention consists in certain novel features of construction, and in combinations of parts more fully described hereinafter, and particularly pointed out in the claims.

Farmers ordinarily sow their wheat and other small grain on top of the ground and plow it in with a stirring-plow in order to get the grain as deep as possible. This is especially necessary in high altitudes, where precipitation of moisture is not so frequent as in the low land, where shallow planting is better. However, this method of planting possesses many disadvantages, as the seed is planted at uneven depths and in reality does not go very far below the surface; consequently the grain grows up of uneven heights and does not all ripen at the same time, and also is not planted deep enough to insure a firm hold nor sufficient moisture, and there is consequently great loss.

By the use of our invention any kind of grain or seed can be sowed at any desired depth and in any desired quantity and evenly and at a uniform depth, and can all be done at the same time as the ground is first plowed.

Figure 1:
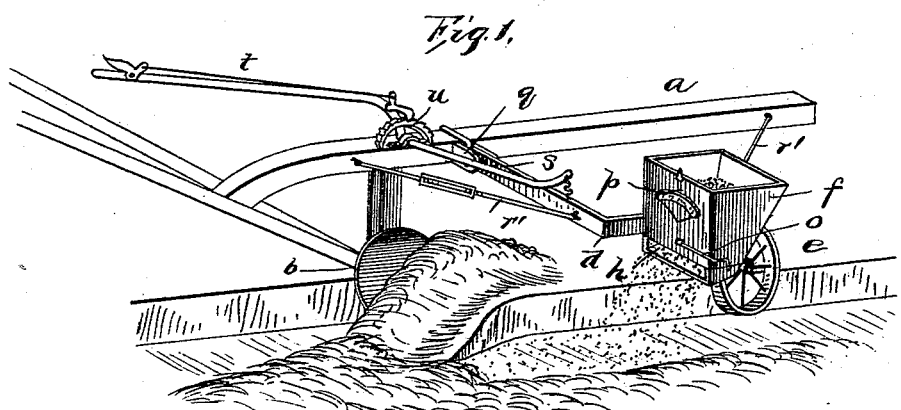
Figure 2:
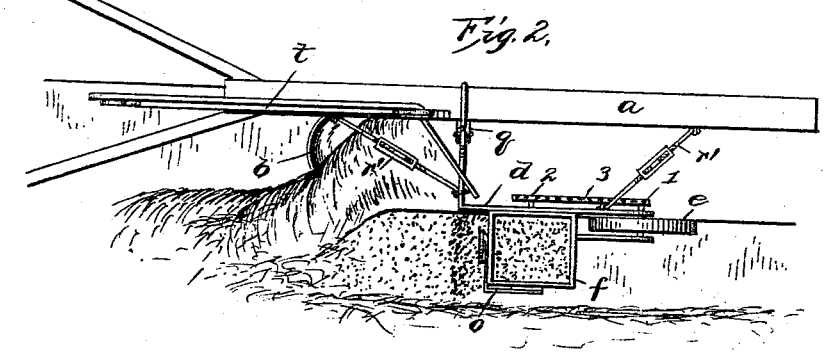
Figure 3:
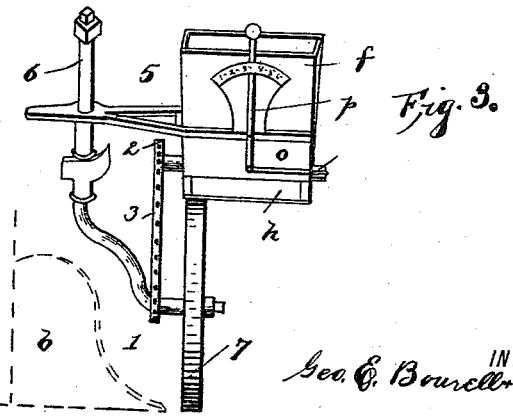

Referring to the accompanying drawings, Figures 1 and 2 show an ordinary plow provided with the present invention. Figs. 3 and 4 show the invention attached to a sulky-plow. Fig. 5 is a cross-section through the feed-box. Fig. 6 is a longitudinal section, and Fig. 7 is a plan having the force-feed.

In the drawings, the reference-letter $a$ indicates the beam of an ordinary plow having a mold-bar $b$ and the handles $c$.

$d$ is the frame, at one end loosely attached to the plow-beam on the mold-board side and extending forwardly at an angle and at its front end bifurcated. Furrow-wheel $e$ is journaled between the forks of the bifurcated front ends of said loosely-attached frame so as to run close against the land side of the completed furrow, which is being filled by the mold-board as it forms the next furrow. A seed-box $f$ is vertically and rigidly supported on this frame in advance of the mold-board and in rear of said furrow-wheel and, preferably, with its inner land side in line with the furrow-wheel, so that the bottom of the box is located directly over the last-completed furrow. This box has a force-feed in its bottom driven by horizontal shaft $g$, and said shaft is driven from the furrow-wheel through the medium of sprocket-wheels 1 2 and sprocket-chain 3. The rearwardly and downwardly inclined grain-board $h$ is located beneath the discharge-opening of said box, and is open along its rear lower edge, so that the seed or grain discharged from the box will be evenly distributed in the open furrow just in front of the mold-board, which will cover said furrow and the grain therein as it turns the next furrow, the grain thus being covered on solid earth three or four inches or any other suitable distance beneath the surface where the earth is moist, and the grain will secure a firm footing as it grows.

The grain-feed box preferably consists of an open box ordinarily having but one compartment, closed at the bottom by the thick, preferably metal, feed-bed $i$. This feed-bed has one or more nests or pockets $j$, terminating at their lower ends in the discharge-openings $k$. Each pocket is substantially semi-spherical in shape, with a groove $j'$ extending down to the feed-opening in its rear wall. An integral feed-burr $k'$, preferably composed of metal, is located in each feed pocket or nest and is mounted rigidly on a horizontal drive-shaft extending through the bottom of the pocket, as before described. Each burr is composed of a series of radial wings $l$. These wings are all an equal distance apart, so as to form pockets between them, and as a burr rotates transversely and forwardly through the bottom of the feed-box the grain is caught in the pockets between the wings and an equal quantity is forced down through the before-mentioned groove in the seat in front of each wing, and the grain is thus discharged continuously upon the inclined grain-board, upon which it falls and scatters, and is then evenly distributed. The transverse width of the upper ends of the seat or socket is preferably greater than the diameter of the burr operating therein. The lower ends of the discharge-openings from the feed-box can be regulated in size by transverse slide $n$, having openings corresponding with the discharge-openings, so that the discharge-openings can be completely closed or made of any suitable size by operating this slide. One or both ends of the slide can project beyond the sides of the seed-box, and a push-rod or pitman $o$ is loosely connected to said slide, and also at its opposite end to the lower end of lever $p$ on the back of the feed-box, so that the slide can be moved to regulate the discharge-openings by rocking said lever in opposite directions, and the lever can be provided with a curved scale indicating the quantity of seed sown to the acre by the feed device when the lever is in its various positions.

The peculiar construction of feed-burr and the nest or pocket that it works in constitutes a very important and advantageous construction, as the grain is allowed to discharge freely and in just such quantities as the opening covered by the slide-gage will allow, and the grain or seed will be carried back up in the box again without danger of cracking the kernels or otherwise injuring them, and by reason of the slide-gage and the peculiar construction of said burrs and box the device can be used for sowing corn or grass or any seed by merely regulating the size of the openings by the slide-gage.

The frame $d$ at its rear end is secured to the plow-beam by laterally-swinging clevis $q$, so that the said frame can be adjusted laterally with reference to the plow-beam by means of the braces $r'$ $r'$, having the screw-coupling or adjusting-link, as shown. The rear end of the frame is provided with a series of apertures $s$, so that the cover with the clevis can be varied or adjusted. By means of this adjustment the seed-box can be brought closer to or farther from the plow-beam in connection with the said seat by braces which serve to hold the seeder attachment firm and steady and allow it to be adjusted to any length of plow-beam. A rearwardly-extending lever $t$ is mounted on the beam and provided with ratchet-locking mechanism $u$, and this lever has a rigid crank-arm loosely connected with the seeder-frame, so that the entire seeder can be raised from the ground by means of this lever.

It should be understood that this seeder attachment can be applied to any plow or, if desired, to a cultivator in advance of the cultivating-teeth of the mold-board of the plow. The seeder can also be attached to any sulky-plow by means of rigid arms, braces, or other supports which will firmly carry the seed-box from the frame of the plow and in advance of the mold-board and near or just above the mold-board. The manner of supporting the seeder from the sulky-plow frame will vary according to the construction of the plow, but the position of the box with reference to the mold-board will remain substantially the same. Figs. 3 and 4 illustrate one manner of securing the grain-box to the frame of a sulky-plow. 5 indicates the supporting rods or braces from the frame 6 of the plow, and 7 indicates the furrow-wheel, which drives the force-feed of the box, the same as before described. A portion only of the sulky-plow is here shown.

In operating the present invention in connection with the walking-plow the seed-box is connected firmly to the beam, so as to set just far enough ahead of the mold-board to allow the grain to strike the furrow before the ground falls upon it. The seeder attachment runs smoothly and evenly, and, in fact, serves to cause the plow itself to run steadily, and when it is desired to turn the plow the raising and lowering lever can be operated to raise the seeder attachment entirely from the ground, and when the plow is again started to open the furrow the seeder can be dropped again. When the seeder attachment is used on the sulky-plow, the feed can be shut off by the slide-gage when it is desired to turn the plow. The entire attachment is simple and very light, and its main object is to put the grain into the ground deeper than can be done ordinarily with any other drill.

The many advantages of this invention are obvious to all farmers.

Having thus fully described our invention, what we desire to claim, and secure by Letters Patent, is—

1. In combination, a plow, the frame extending forwardly from the beam thereof and loosely secured thereto, a wheel supporting the outer end of the frame and arranged to travel in an open furrow, lifting-lever fulcrumed on the beam and loosely jointed to the outer portion of the frame, locking means whereby said lever can hold the frame raised, longitudinally-adjustable brace-rods between the beam and outer portion of the frame, and a seeding device carried by the outer portion of the frame provided with a feeding device driven from such wheel, and means, as a grain-board, to distribute the grain in the open furrow.

2. The combination, with a plow, of an auxiliary frame attached thereto and extending laterally therefrom, the elevated seed-box carried by such frame, said box having a discharge in its bottom, a rotating feed-burr in such discharge, operating-gearing to drive such burr from the furrow-wheel, and the grain-board beneath such discharge inclined downwardly and rearwardly, so that its rear lower edge will be above the open furrow in advance of the mold-board, substantially as described.

3. In a seeding attachment for plows, the frame, a furrow-wheel, the elevated seed-box carried by such frame having the thick bottom plate, an elliptical pocket therein terminating in a discharge-opening, a groove in said bottom plate at the front side of the pocket and extending from the top to the bottom thereof, a horizontal shaft in the bottom of said box, gearing rotating said shaft from the furrow-wheel, and the feed-burr rigid on said shaft and snugly fitting to rotate in said pocket, said burr having the radial pockets and means to distribute the grain.

In testimony that we claim the foregoing as our own we affix our signatures in presence of two witnesses.

GEORGE E. BOURELL.
ELIAS M. HARRISON.

Witnesses:
B. F. HASTINGS,
R. W. SAVAGE.